United States Patent
Katai et al.

(10) Patent No.: US 7,060,214 B2
(45) Date of Patent: Jun. 13, 2006

(54) POLYMER RESIN FILM AND ITS PRODUCTION

(75) Inventors: Yukihiro Katai, Kanagawa (JP); Tadahiro Tsujimoto, Kanagawa (JP); Toshikazu Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 269 days.

(21) Appl. No.: 10/303,907

(22) Filed: Nov. 26, 2002

(65) Prior Publication Data

US 2004/0234798 A1 Nov. 25, 2004

Related U.S. Application Data

(62) Division of application No. 09/906,830, filed on Jul. 18, 2001.

(30) Foreign Application Priority Data

Jul. 25, 2000 (JP) ............................. 2000-223249

(51) Int. Cl.
*B29C 41/24* (2006.01)
(52) U.S. Cl. ...................... 264/212; 264/217
(58) Field of Classification Search ............... 264/212, 264/102, 101, 214, 40.1, 217; 428/1.1, 1.3, 428/1.31, 1.33, 141, 156
See application file for complete search history.

(56) References Cited

U.S. PATENT DOCUMENTS 3,038,209 A * 6/1962 Hunter, Jr. et al. ..... 264/211.12
4,783,304 A * 11/1988 Heyer ........................ 264/556
5,244,713 A * 9/1993 Nakamura et al. .......... 428/156
5,393,476 A 2/1995 Suzuki
5,773,126 A 6/1998 Noritake et al.
6,183,829 B1 2/2001 Daecher et al.
6,368,534 B1 * 4/2002 Nakamura et al. .......... 264/216

FOREIGN PATENT DOCUMENTS

| EP | 0 376 696 A1 | 7/1990 |
| EP | 0 488 369 A2 | 6/1992 |
| JP | 11060807 A | 3/1999 |
| JP | 11090943 A | 4/1999 |

OTHER PUBLICATIONS

European Search Report dated Apr. 13, 2004.

* cited by examiner

*Primary Examiner*—Mark Eashoo
(74) *Attorney, Agent, or Firm*—Sughrue Mion, PLLC

(57) ABSTRACT

In the transparent film of optical application or the support for photographic material produced by a solution film forming method, the polymer resin film on which any coating unevenness does not occur even when a functional layer is coated on the film surface and the manufacturing method for the film are proposed.

To be concrete, a polymer resin film produced by the solution film forming method characterized by that the pitch a [cm] of the periodic thickness unevenness of web longitudinal direction and a thickness unevenness factor d [%] satisfy formula (1) described below.

$$d \leq 0.46\ a^3 - 0.91\ a^2 + 0.60\ a + 1.01 \qquad (1)$$

(on the premise that $0.2 < a < 3$)

The manufacturing method using said formula is also proposed.

12 Claims, 11 Drawing Sheets

POLYMER RESIN FILM AND ITS PRODUCTION

This is a divisional of Application No. 09/906,830 filed Jul. 18, 2001, the disclosure of which is incorporated herein by reference.

FIELD OF THE INVENTION

The present invention relates to a polymer resin film that is used to transparent film of optical application such as protective film for polarizing plates or used to support for photographic material, and relates to manufacturing method for the polymer resin film.

More particularly, the present invention relates to the polymer resin film on which any coating unevenness does not occur even when a functional layer is coated on the film surface, and relates to the manufacturing method for the film.

BACKGROUND OF THE INVENTION

In general, cellulose triacetate film is used as the transparent film of optical application or as the support for photographic material. The cellulose triacetate film is produced by solution film forming method.

In the solution film forming method, the polymer solution dissolved in organic solvent is cast from a die onto a casting band or a casting drum, and at the same time, a casting ribbon is made to touch closely to the casting band or the casting drum by the effect of a reduced pressure chamber which is provided in the neighborhood of the die.

The casting ribbon defines a liquid membrane between a discharge opening of the die and the surface of the casting band or the casting drum.

As an example of the solution film forming method, Japanese Patent KOKOKU 49-36946 proposes a casting method of liquid composition in which a reduced pressure chamber having two aspiration chambers in order to prevent an air companion make a liquid composition flow touch tight with the casting drum.

Moreover, Japanese Patent KOKOKU 62-38133 and Japanese Patent KOKOKU 63-57222 propose a uniform holding apparatus of the web that can stabilize edge beads by establishing two vacuum zones with an insulation wall.

Furthermore, Japanese Patent KOKAI HEI 5-86212 and so on propose the casting method which prevents development of an uneven surface drying defect by using a dope made by mixing a rich solvent and a poor solvent with specific rate.

However, as for the polymer resin film produced by the conventional solution film forming method, minute periodic lateral thickness unevenness occurs in a longitudinal direction of the film because the casting ribbon oscillates with a certain frequency caused by oscillation disturbance with wind pressure oscillation or machine oscillation such as air core oscillation in reduced pressure chamber, air core oscillation of a suction duct for pressure reduction, and the oscillation of the reduced pressure chamber transmitting from a blower connected to the suction duct.

In particular, in late years, as a thin film device technology of the liquid crystal display (referred to as LCD) progresses, a thin film technology is pursued in each element and a thin film technology is also demanded to protective coat for polarizing plate.

However, the leveling effect that is characteristic of a solution film forming method reduces by the thin film technology, and various kinds of thickness unevenness become distinguished.

By the way, the transparent film of optical application is applied an anti glare layer coating in order to give, for example, a hard coat or antireflection function. However, the coating unevenness that is caused by thickness unevenness in film base injures appearance value and functionality of the film of optical application triggering big problems on quality of the LCDs.

Moreover, similar problem occurs in emulsion coating on support for photographic material.

The object of the present invention is to solve the above-described problems and to provide a polymer resin film and the manufacturing method which does not cause any coating unevenness even when various functional layer are coated on the film produced by the a solution film forming method.

SUMMARY OF THE INVENTION

In accordance of this invention, it has been found after the zealous studies for the achievement of the object by the inventor that good appearance quality can be obtained even after the coating is applied to the polymer resin film, under the condition that the relation between the pitch of the thickness unevenness and the thickness unevenness itself is among the appointed domain in the predetermined field of the periodic longitudinal thickness unevenness.

That is to say, a polymer resin film of this invention is produced by the solution film forming method and is characterized by that the pitch a [cm] of the periodic thickness unevenness of web longitudinal direction and a thickness unevenness factor d [%] satisfy formula (1) described below.

$$d \leq 0.46\, a^3 - 0.91\, a^2 + 0.60\, a + 1.01 \quad (1)$$

(On the premise that $0.2 < a < 3$)

Furthermore, in accordance of this invention, it has been found that good appearance quality can be obtained even after the coating is applied to the polymer resin film, under the condition that the relation between the expansion rate of the casting ribbon, a casting velocity, and an expansion frequency are among appointed domain.

That is to say, a manufacturing method for the polymer resin film of this invention is the method in which the polymer resin solution dissolved in organic solvent is cast on support from the casting die characterized in that the casting velocity v [cm/s], the expansion frequency f [1/s], and the expansion rate e [%] satisfy formula (3) described below.

$$e \leq 0.46(v/f)^3 - 0.91(v/f)^2 + 0.60(v/f) + 1.01 \quad (3)$$

(On the premise that $0.2 < (v/f) < 3$)

DESCRIPTION OF THE PREFERRED EMBODIMENTS

In the polymer resin film of this invention, regarding the lateral thickness unevenness where the thickness unevenness pitch a [cm] is in the range of from 0.2 cm to 3 cm in the longitudinal direction of the web, the relation between the pitch a and the thickness unevenness factor [1%] satisfies the formula (1) described below:

$$d \leq 0.46\ a^3 - 0.91\ a^2 + 0.60\ a + 1.01 \tag{1}$$

and it is desirable for them to satisfy the following formula (2):

$$d \leq 0.19\ a^3 - 0.38\ a^2 + 0.25\ a + 0.42 \tag{2}$$

Figure 1:
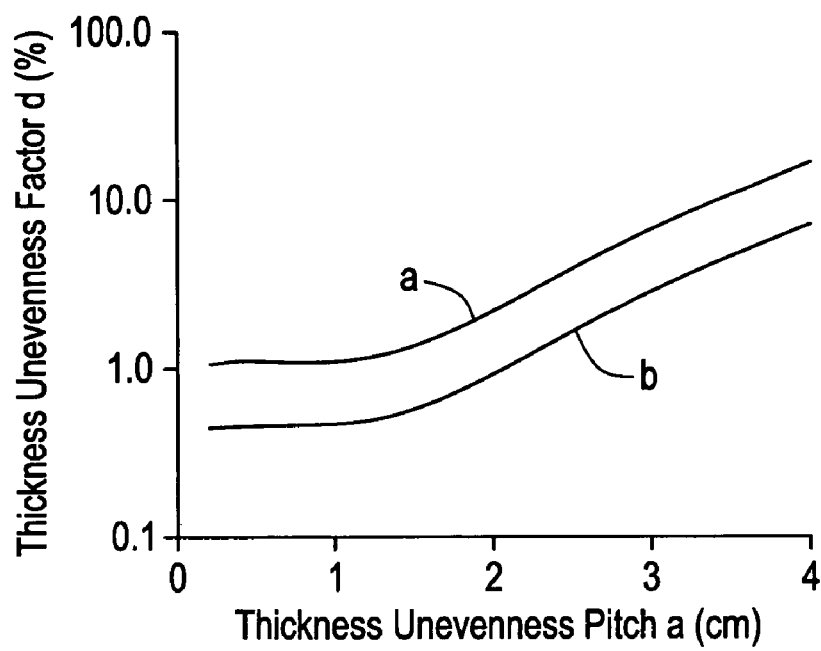
FIG. 1 is a graph showing a relation between a thickness unevenness factor and a thickness unevenness pitch, and a relation between the thickness unevenness factor and a visual recognition average of the coating unevenness.

That is to say, the inventor got a result as shown in FIG. 1 regarding the relationship between the pitch a [cm] of the periodic thickness unevenness in the longitudinal direction of the web and the thickness unevenness factor d [%], and regarding the visual recognition about the strength or weakness of the coating unevenness.

In FIG. 1, the curve a shows said formula (1), and the curve b shows said formula (2). In the domain over the curve a, the coating unevenness is recognized as strong. In the domain between the curve a and the curve b, the coating unevenness is recognized as weak. In the domain under the curve b, any coating unevenness cannot be recognized.

The strength and weakness of the coating unevenness was evaluated by visual observation.

In addition, thickness unevenness factor is the value that was obtained by dividing the difference of the maximum value and the minimum value of convexo concave of a thickness unevenness by mean thickness of the film.

As for the measurement of the pitch of the thickness unevenness or the thickness unevenness factor, there are a method of reading the pitch, the maximum value, the minimum value, and average of the periodic thickness unevenness from the measurement chart or a method of frequency analysis and reading the peak value of the thickness fluctuation after a continuous measurement of the film thickness along the longitudinal direction. A contact type continuous thickness gauge or a non-contact type continuous thickness gauge can execute continuous measurement of the thickness of the polymer resin film.

Settlement of the thickness unevenness pitch and the thickness unevenness value among such designated range can be achieved by depression of feeding amount pulsation of solution, machine oscillation of casting part, a velocity unevenness of moving support, and static pressure fluctuation or dynamic pressure fluctuation of casting ribbon from the die lip, and by predetermining of appropriate ribbon length.

In addition, in the case where the pitch of a longitudinal thickness unevenness of the film is 0.2 cm or less, it is desirable that thickness unevenness factor is 2% or less, and more desirable that it is 1% or less. When the thickness unevenness factor exceeds 2%, the coating unevenness appears to be strong.

Furthermore, in the case where the pitch of a longitudinal thickness unevenness of the film is 3 cm or more, it is desirable that thickness unevenness factor is 7% or less, and more desirable that it is 2.8% or less. When the thickness unevenness factor exceeds 7%, the coating unevenness appears to be strong.

According to the manufacturing method of the polymer resin film of the present invention, in the case where the quotient obtained by dividing the casting velocity with the expansion frequency is in the range of from 0.2 cm to 3 cm, a casting velocity v [cm/s], an expansion frequency f [1/s], and expansion rate e [%] of the casting ribbon satisfy the following formula (3), $$e \leq 0.46 \ (v/f)^3 - 0.91(V/f)^2 + 0.60 \ (v/f) + 1.01 \quad (3)$$

And it is desirable for them to satisfy the following formula (4):

$$e \leq 0.19 \ (v/f)^3 - 0.38 \ (v/f)^2 + 0.25 \ (v/f) + 0.42 \quad (4)$$

Figure 2:
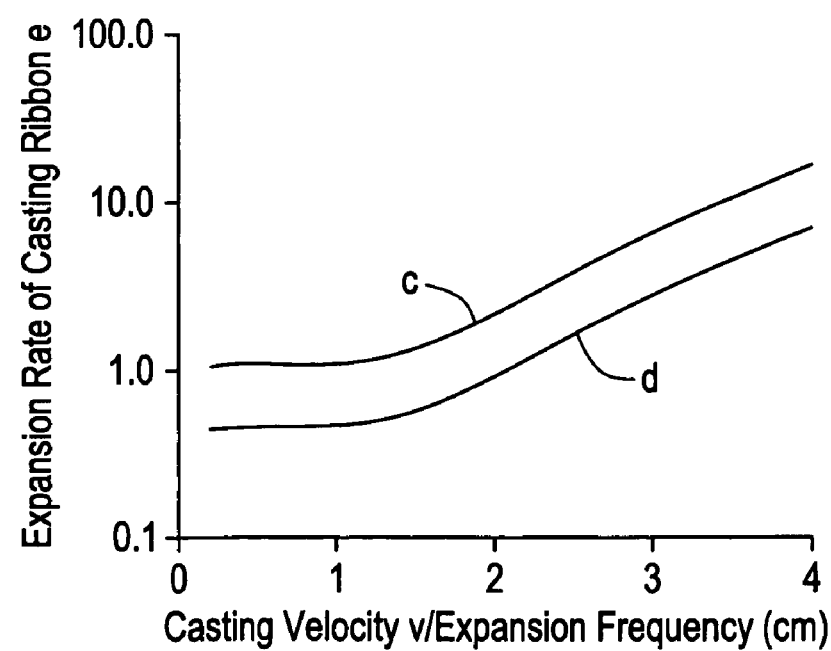
FIG. 2 is a graph showing a relation among the casting velocity, the expansion frequency, and the expansion rate and showing a relation among the casting velocity, the expansion frequency, and the visual recognition average of the coating unevenness.

That is to say, the inventor got a result as shown in FIG. 2 regarding the relationship between the expansion rate e of the casting ribbon, the casting velocity v, and the expansion frequency f.

In FIG. 2, the curve c shows said formula (3), and the curve d shows said formula (4).

In the domain over the curve c, the coating unevenness is recognized as strong. In the domain between the curve c and the curve d, the coating unevenness is recognized as weak. In the domain under the curve d, any coating unevenness cannot be recognized.

The strength and weakness of the coating unevenness was evaluated by visual observation.

Mean length l of the casting ribbon is the length of liquid membrane from the discharge opening of the casting die to the casting band or the casting drum. The mean length l of the casting ribbon is obtained as the mean value of the maximum length and the minimum length measured after video recording the image of the casting ribbon.

The casting velocity v is defined as the moving speed of the casting band or the casting drum. The casting velocity v is obtained by measuring the number of revolutions of a driving motor for the casting band or the casting drum, or by direct measurement of the moving speed of the casting band or the casting drum by contact type speedometer or a non-contact type speedometer.

The expansion frequency f is defined as the telescopic motion frequency of the casting ribbon within one second. The expansion frequency f is obtained by frequency analysis of the variation of length of the casting ribbon after the continuous measurement of it from the video recorded image of the casting ribbon.

The expansion rate e is defined as the value obtained by dividing the difference between the maximum length and the minimum length of the casting ribbon with the mean length of the casting ribbon.

Settlement of these casting velocity, the expansion frequency, and the expansion rates among such designated range can be achieved by depression of the feeding amount pulsation of solution, the machine oscillation of the casting part, the velocity unevenness of the moving support, and the static pressure fluctuation or the dynamic pressure fluctuation of the casting ribbon from the die lip, and by predetermining of appropriate ribbon length.

The static pressure fluctuation range of atmosphere including casting ribbon is desirable to be 2.4 Pa or less, more desirable to be 2.0 Pa or less, and most desirable to be 0.5 Pa or less. When the static pressure fluctuation range exceeds 2.4 Pa, the thickness unevenness becomes too conspicuous, and it is not practical.

The reduction of the static pressure fluctuation range to said 2.4 Pa or less can be achieved by vibration regulation of wind flow duct, etc.

As for the static pressure fluctuation range, there are methods of reading a period, the maximum value, and the minimum value of periodic static pressure fluctuation from the measurement chart or a method of frequency analysis and reading the peak value of the static pressure fluctuation after a continuous measurement of the static pressure with a pressure sensor.

Referring now from FIG. 3 to FIG. 8, the embodiments of the solution film forming apparatus for the polymer resin film by this invention may be explained below.

Figure 3:
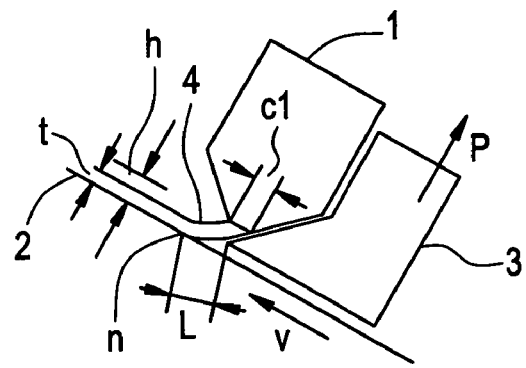
FIG. 3 is a schematic illustration of the casting die division of the solution film forming apparatus that can be used in the manufacturing method for the polymer resin film of this invention.

FIG. 3 is a schematic illustration of the casting die division of the solution film forming apparatus of this invention. With respect to FIG. 3, the casting ribbon 4 is being cast from casting die 1 to the support (casting band or casting drum) 2 under the assistance of pressure reduction chamber 3.

The solution film forming apparatus may be the solution film forming apparatus using the casting band having a surface with mirror plane finish or the solution film forming apparatus using the casting drum having a surface with mirror plane finish.

Figure 4:
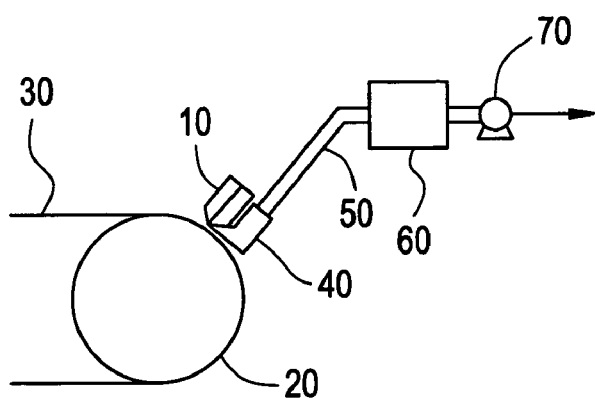
FIG. 4 is a schematic illustration of the solution film forming apparatus that can be used in the manufacturing method for the polymer resin film of the present invention.

FIG. 4 is the solution film forming apparatus using the casting band. As shown in FIG. 4, rotating drum 20 is installed facing casting die 10, and casting band 30 is conveyed turning around the rotating drum 20. In addition, pressure reduction chamber 40 is arranged adjacent to casting die 10. The pressure reduction chamber 40 is connected to blower 70 with being intervened by suction duct 50 and buffer tank 60.

Figure 5:
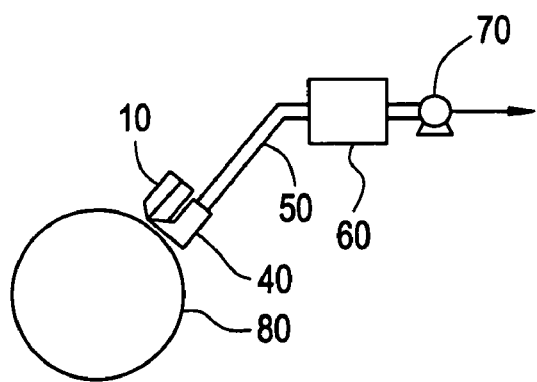
FIG. 5 is another schematic illustration of the solution film forming apparatus that can be used in the manufacturing method for the polymer resin film of the present invention.

FIG. 5 illustrates the solution film forming apparatus using the casting drum. As shown in FIG. 5, casting drum 80 is installed instead of rotating drum 20 and casting band 30 in FIG. 4. In addition, reduced pressure chamber 40, suction duct 50, buffer tank 60, and blower 70 are arranged in the same way as the solution film forming apparatus as shown in FIG. 4.

Figure 6:
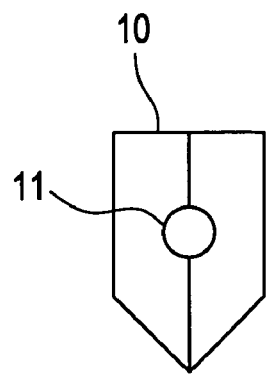
FIG. 6 is a schematic sectional view of the casting die that can be used in the manufacturing method for the polymer resin film of this invention.
Figure 7:
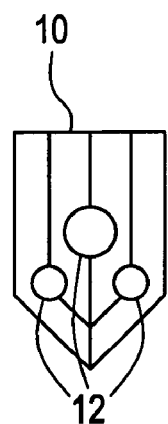
FIG. 7 is another schematic sectional view of the casting die that can be used in the manufacturing method for the polymer resin film of this invention.
Figure 8:
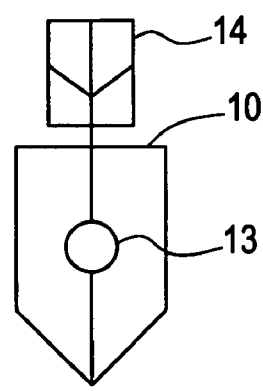
FIG. 8 is another schematic sectional view of the casting die that can be used in the manufacturing method for the polymer resin film of this invention.

As said casting die, those type such as shown in FIG. 6, FIG. 7 and FIG. 8 can be applied. FIG. 6 shows a casting die used for the film forming of monolayer film. In FIG. 6, the casting die 10 mainly consists of a manifold 11.

FIG. 7 shows a multi-manifold type casting die. In FIG. 7, casting die 10 consists of three manifold 12, and has capability for film forming of three layers structure.

FIG. 8 shows feed block type multiple casting die. In FIG. 8, the multiple casting die 10 comprises manifold 13 and feed block 14 that cast the multilayer dope joined in feed block 13. In addition, regarding the above-mentioned casting dies, a coat hanger die is adopted, but there is no limitation to the die, and any other die of T-die configuration, etc. may be also adopted. Die lip clearance cl in a solution film forming method is usually settled to be in the range of from 0.2 mm to 3 mm, desirably from 0.5 mm to 2.5 mm, but it is not limited to these value.

Distance h between the casting die and the support is usually settled to be in the range of from 1 mm to 10 mm, desirably from 1.5 mm to 6 mm, but it is not limited to these value.

Pressure reduction degree p of pressure reduction chamber is usually settled to be in the range of from −500 Pa to −10 Pa, desirably from −400 Pa to −20 Pa, but it is not limited to these value.

Casting velocity v is usually settled to be in the range of from 3 m/minute to 150 m/minute, desirably from 10 m/minute to 100 m/minute, but it is not limited to these values.

The film thickness t is desirable to be in the range of from 20 μm to 500 μm, more desirable to be in the range of from 30 μm to 300 μm, and most desirable to be in the range of from 35 μm to 200 μm, but it is not limited to these value.

It is desirable that the feeding amount pulsation of solution is 0.3% or less, that the oscillation displacement of the casting die is within 0.02% of the distance between the die and the support, and that the velocity fluctuation of moving support is within 0.02% of average velocity of the moving support.

It is desirable to provide wind shielding means in the neighborhood of the casting part of the solution film forming apparatus because it can reduce the dynamic pressure disturbance acting on the casting ribbon.

As the wind shielding means, a wind shielding plate, a wind shielding block, a wind shielding box, and a wind shielding fin may be applied. In addition, it is desirable for the wind shielding means to adapt aspiration measure such as a blower in order to increase wind shielding effect. Further, these wind shielding means or aspiration means may be used alone or optionally, in combination.

Referring now from FIG. 9 to FIG. 33, embodiments of the solution film forming apparatus with the wind shielding means will be explained.

Figure 9:
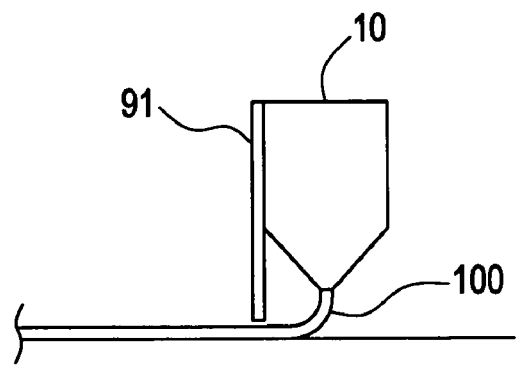
FIG. 9 is a schematic illustration of the casting die division of the solution film forming apparatus with a wind shielding plate.

According to the solution film forming apparatus shown in FIG. 9, wind shielding plate 91 is arranged to contact the downstream side of casting die 10 (the flowing direction side of casting ribbon 100, same in below).

Figure 10:
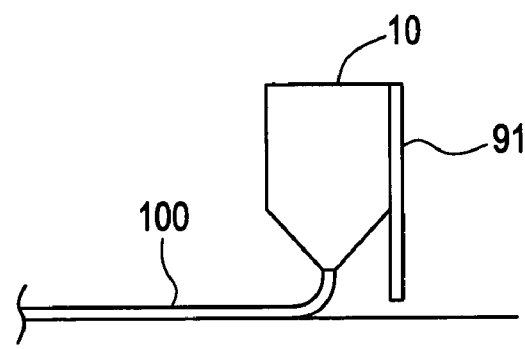
FIG. 10 is another schematic illustration of the casting die division of the solution film forming apparatus with a wind shielding plate.

According to the solution film forming apparatus shown in FIG. 10, wind shielding plate 91 is arranged to contact the upstream side of casting die 10 (opposite to the flowing direction side of casting ribbon, same in below).

Figure 11:
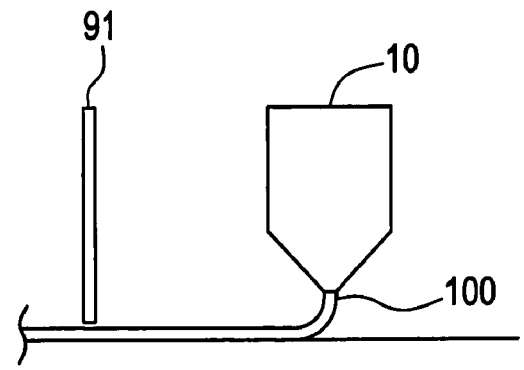
FIG. 11 is another schematic illustration of the casting die division of the solution film forming apparatus with a wind shielding plate.

According to the solution film forming apparatus shown in FIG. 11, wind shielding plate 91 is separated with a small distance from the downstream side of casting die 10.

Figure 12:
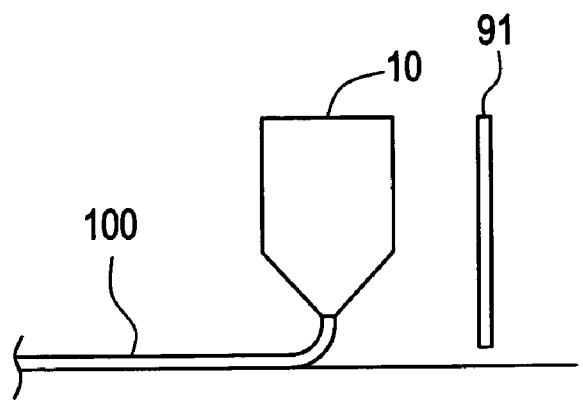
FIG. 12 is another schematic illustration of the casting die division of the solution film forming apparatus with a wind shielding plate.

According to the solution film forming apparatus shown in FIG. 12, wind shielding plate 91 is separated with a small distance from the upstream side of casting die 10.

Figure 13:
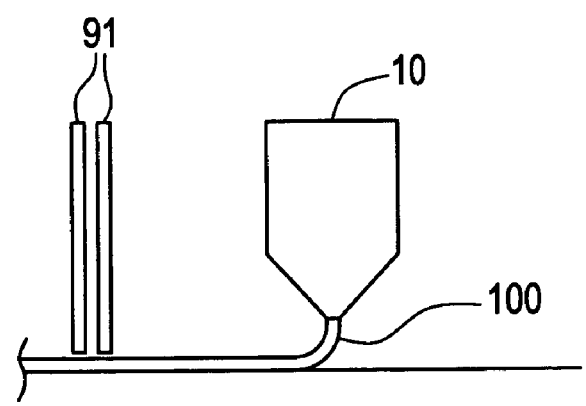
FIG. 13 is another schematic illustration of the casting die division of the solution film forming apparatus with a wind shielding plate.

According to the solution film forming apparatus shown in FIG. 13, two pieces of wind shielding plate 91 are separated with a small distance from the downstream side of casting die 10.

Figure 14:
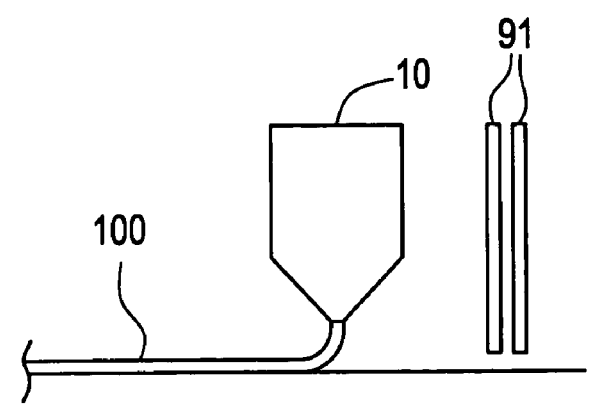
FIG. 14 is another schematic illustration of the casting die division of the solution film forming apparatus with a wind shielding plate.

According to the solution film forming apparatus shown in FIG. 14, two pieces of wind shielding plate 91 are separated with a small distance from the upstream side of casting die 10.

Figure 15:
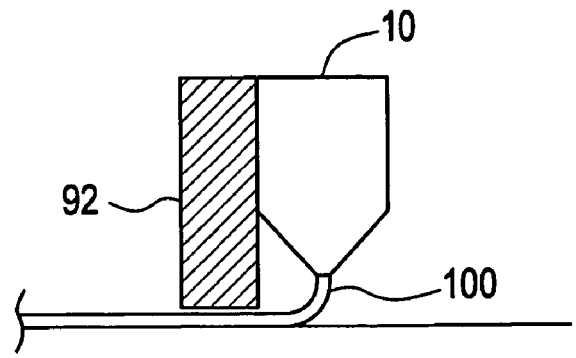
FIG. 15 is a schematic illustration of the casting die division of the solution film forming apparatus with a wind-shielding block.

According to the solution film forming apparatus shown in FIG. 15, wind shielding block 92 is arranged to contact the downstream side of casting die 10.

Figure 16:
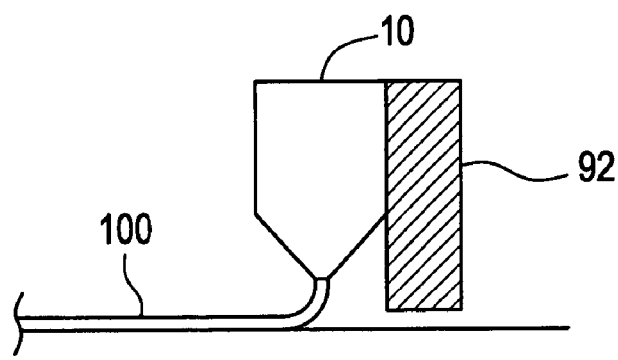
FIG. 16 is another schematic illustration of the casting die division of the solution film forming apparatus with a wind-shielding block.

According to the solution film forming apparatus shown in FIG. 16, wind shielding block 92 is arranged to contact the upstream side of casting die 10.

Figure 17:
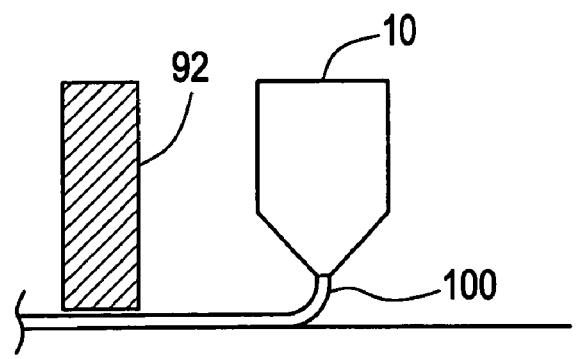
FIG. 17 is another schematic illustration of the casting die division of the solution film forming apparatus with a wind-shielding block.

According to the solution film forming apparatus shown in FIG. 17, wind shielding block 92 is separated with a small distance from the downstream side of casting die 10.

Figure 18:
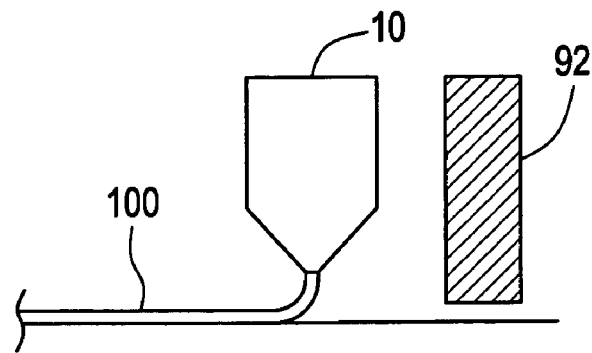
FIG. 18 is another schematic illustration of the casting die division of the solution film forming apparatus with a wind-shielding block.

According to the solution film forming apparatus shown in FIG. 18, wind shielding block 92 is separated with a small distance from the downstream side of casting die 10.

Figure 19:
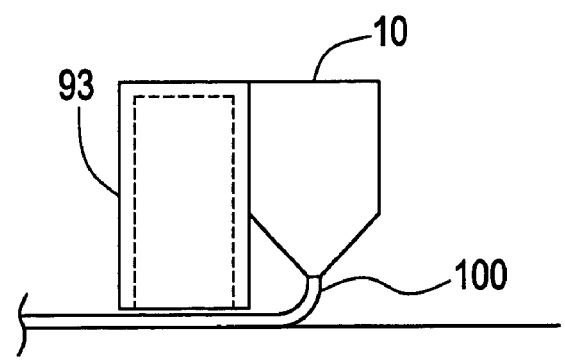
FIG. 19 is a schematic illustration of the casting die division of the solution film forming apparatus with a wind-shielding box.

According to the solution film forming apparatus shown in FIG. 19, wind shielding box 93 is arranged to contact the downstream side of casting die 10.

Figure 20:
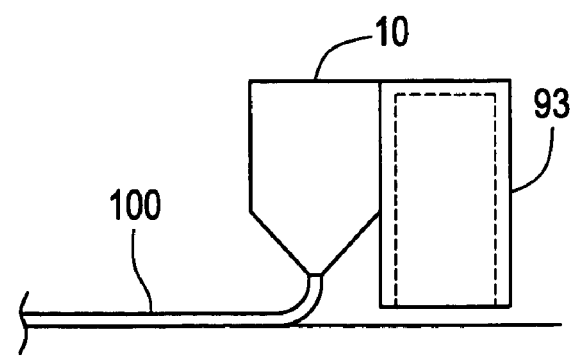
FIG. 20 is another schematic illustration of the casting die division of the solution film forming apparatus with a wind-shielding box.

According to the solution film forming apparatus shown in FIG. 20, wind shielding box 93 is arranged to contact the upstream side of casting die 10.

Figure 21:
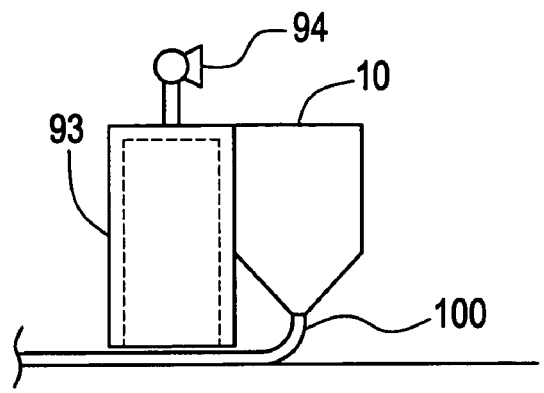
FIG. 21 is another schematic illustration of the casting die division of the solution film forming apparatus with a wind-shielding box.

According to the solution film forming apparatus shown in FIG. 21, wind shielding box 93 is arranged to contact the downstream side of casting die 10, and aspiration blower 94 is adapted to wind shielding box 93.

Figure 22:
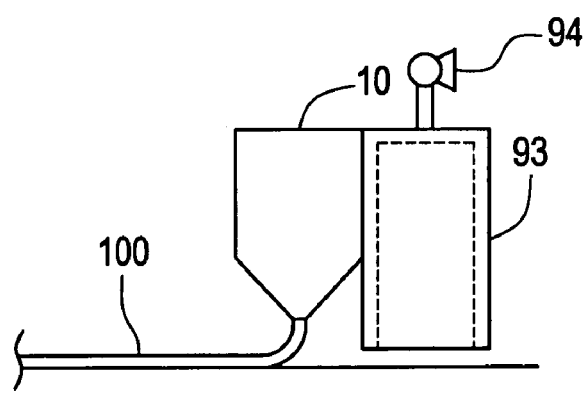
FIG. 22 is another schematic illustration of the casting die division of the solution film forming apparatus with a wind-shielding box.

According to the solution film forming apparatus shown in FIG. 22, wind shielding box 93 is arranged to contact the upstream side of casting die 10, and aspiration blower 94 is adapted to wind shielding box 93.

Figure 23:
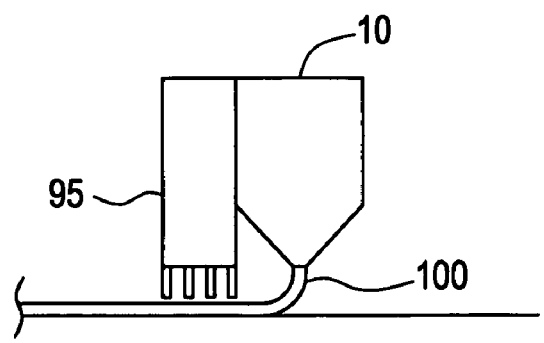
FIG. 23 is a schematic illustration of the casting die division of the solution film forming apparatus with a wind-shielding fin.

According to the solution film forming apparatus shown in FIG. 23, wind shielding fin 95 is arranged to contact the downstream side of casting die 10.

Figure 24:
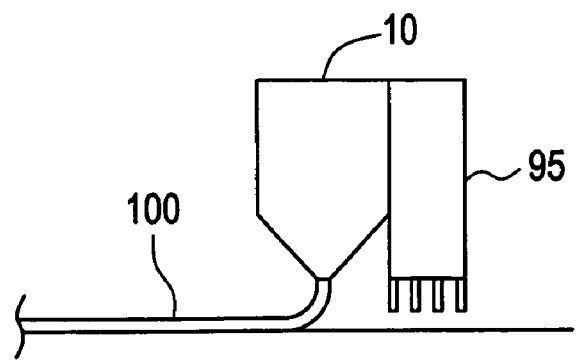
FIG. 24 is another schematic illustration of the casting die division of the solution film forming apparatus with a wind-shielding fin.

According to the solution film forming apparatus shown in FIG. 24, wind shielding fin 95 is arranged to contact the upstream side of casting die 10.

Figure 25:
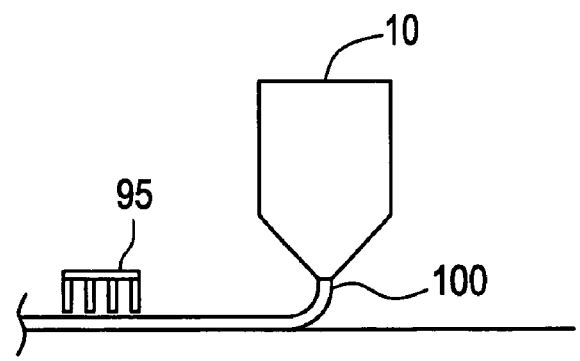
FIG. 25 is another schematic illustration of the casting die division of the solution film forming apparatus with a wind-shielding fin.

According to the solution film forming apparatus shown in FIG. 25, low wind shielding fin 95 is separated with a small distance from the downstream side of casting die 10.

Figure 26:
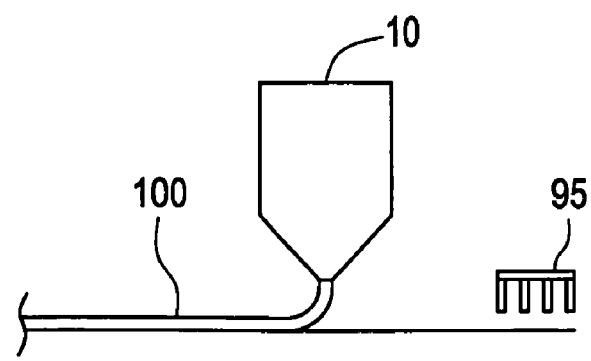
FIG. 26 is another schematic illustration of the casting die division of the solution film forming apparatus with a wind-shielding fin.

According to the solution film forming apparatus shown in FIG. 26, low wind shielding fin 95 is arranged to upstream side of casting die 10.

Figure 27:
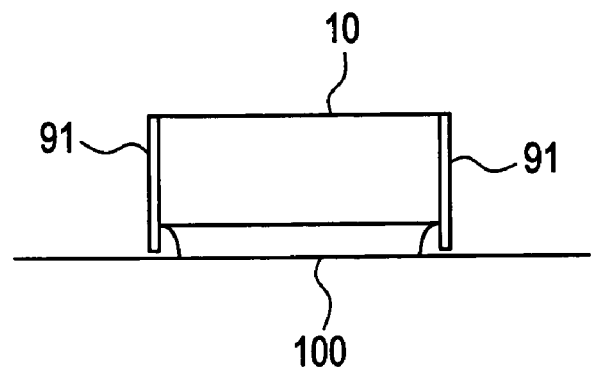
FIG. 27 is a schematic illustration of the casting die division of the solution film forming apparatus with a wind shielding plate.

According to the solution film forming apparatus shown in FIG. 27, wind shielding plate 91 is arranged to contact both upstream side and downstream side of casting die 10.

Figure 28:
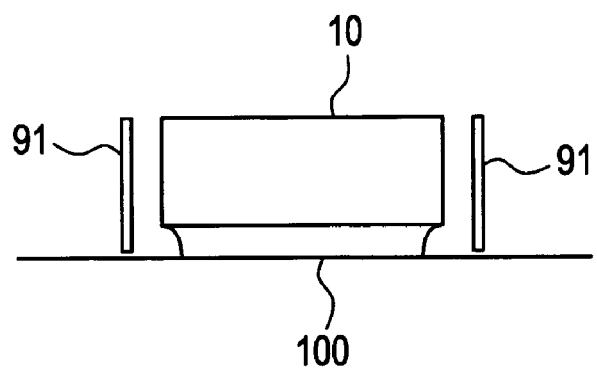
FIG. 28 is another schematic illustration of the casting die division of the solution film forming apparatus with a wind shielding plate.

According to the solution film forming apparatus shown in FIG. 28, wind shielding plate 91 is separated with small distances from both upstream side and downstream side of casting die 10.

Figure 29:
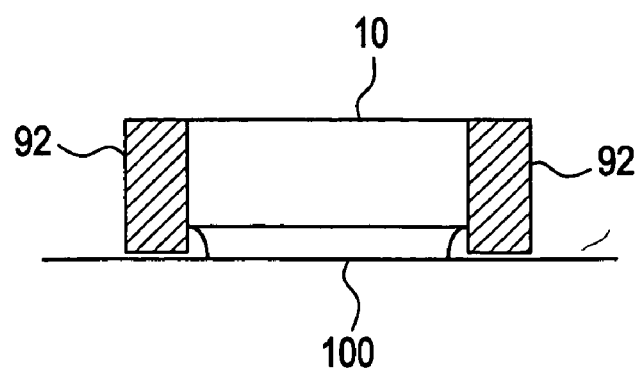
FIG. 29 is a schematic illustration of the casting die division of the solution film forming apparatus with a wind-shielding block.

According to the solution film forming apparatus shown in FIG. 29, wind-shielding block 92 is arranged to contact both upstream side and downstream side of casting die 10.

Figure 30:
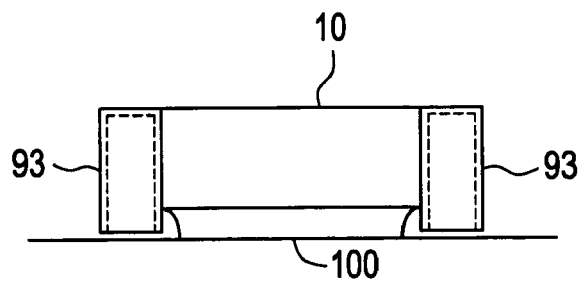
FIG. 30 is a schematic illustration of the casting die division of the solution film forming apparatus with a wind-shielding box.

According to the solution film forming apparatus shown in FIG. 30, wind shielding box 93 is arranged to contact both upstream side and downstream side of casting die 10.

Figure 31:
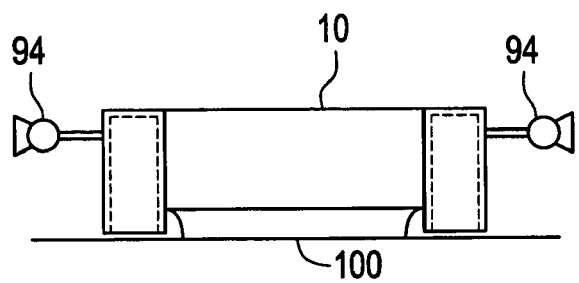
FIG. 31 is another schematic illustration of the casting die division of the solution film forming apparatus with a wind-shielding box.

According to the solution film forming apparatus shown in FIG. 31, wind shielding plate 93 is arranged to contact both upstream side and downstream side of casting die 10, and blower 94 is adapted to wind shielding box 93.

Figure 32:
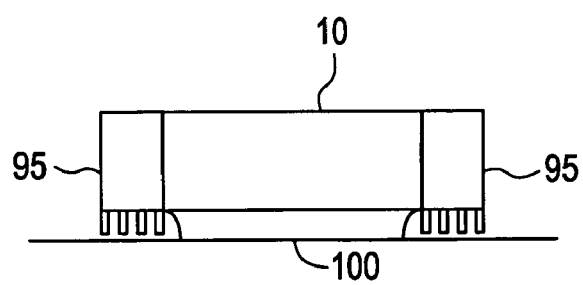
FIG. 32 is a schematic illustration of the casting die division of the solution film forming apparatus with a wind-shielding fin.

According to the solution film forming apparatus shown in FIG. 32, wind shielding fin 95 is arranged to contact both upstream side and downstream side of casting die 10.

Figure 33:
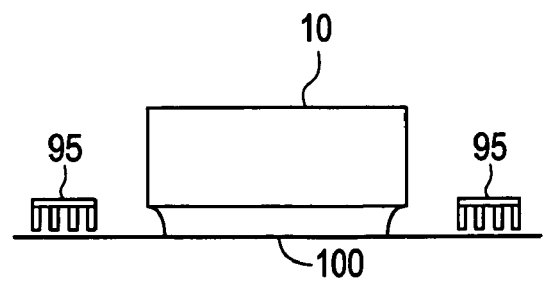
FIG. 33 is another schematic illustration of the casting die division of the solution film forming apparatus with a wind-shielding fin.

According to the solution film forming apparatus shown in FIG. 33, low wind shielding fin 95 is separated with small distances from both upstream side and downstream side of casting die 10.

As high molecular materials of the polymer resin film by the present invention, cellulose ester, polycarbonate, etc. are included. As the cellulose ester, low-grade fatty acid ester of cellulose (for example, cellulose acetate, cellulose acetate butyrate or cellulose acetate propionate) is typical. Low-grade fatty acid means fatty acid of which the number of carbon atom is 6 or less. The cellulose acetate includes cellulose triacetate (TAC) and cellulose diacetate (DAC).

In general, chloride of low-grade aliphatic hydrocarbon or low-grade aliphatic alcohol is employed as the solvent. Typical example of the chloride of low-grade aliphatic hydrocarbon is methylene chloride. Typical examples of low-grade aliphatic alcohol are methanol, ethanol, n-propyl alcohol, isopropyl alcohol, and n-butanol.

As the other examples of solvent, butanone, diethyl ketone, diisobuty ketone, cyclohexanone and methylcyclohexanone are included as both acetone and ketone of which the number of carbon atom is from 4 to 12 and substantially do not include halogenated hydrocarbon.

As the examples of ester of which the number of carbon atom is from 3 to 12, ethyl formate, formic acid propyl, formic acid pentyl, methyl acetate, ethyl acetate, propyl acetate, butyl acetate, pentyl acetate, 2-ethoxy—ethyl acetate, etc. are included.

As the examples of alcohol of which the number of carbon atom is 1 to 6, methanol, ethanol, propanol, iso-propanol, 1-butanol, t-butanol, 2-carbinyl-2-butanol, 2-methoxy ethanol and 2-butoxyethanol, etc. are included.

As the examples of ether of which the number of carbon atom is from 3 to 12, diisoprpyl ether, dimethoxymethane, dimethoxyethane, 1,4-dioxane, 1,3 -dioxolane, tetrahydrofuran, anisole and phenetole, etc. are included.

In addition, as the examples of cyclic hydrocarbon of which the number of carbon atom is from 5 to 8, cyclopentane, cyclohexane, cycloheptane and cyclooctane, etc. are included. As the solvent, methylene chloride is particularly desirable. Other solvent may be mixed to use in the methylene chloride. However, it is desirable that the mixing rate of methylene chloride is 70 weight % or more.

The mixing rate from 75 to 93 weight % of the methylene chloride, and from 7 to 25 weight % of the other solvent is particularly desirable. The solvents are removed in the process of cellulose ester film formation.

In general, residue of solvent is less than 5 weight %, and it is desirable to be less than 1 weight %, more desirable to be less than 0.5 weight %.

In addition, additives such as plasticizer, ultraviolet absorbent, and degradation inhibitor may be added to the solvent. The polymer resin film by the present invention can be applied to the protective film for polarizing plate, and to the support for photographic material, etc.

EXAMPLES

The materials and other conditions that were employed in the examples of the solution film forming process are as the followings:

| | |
|---|---|
| Cellulose triacetate | 100 part by weight |
| Triphenylphosphate | 10 part by weight |
| Biphenyldiphenylphosphate | 5 part by weight |
| Methylene chloride | 315 part by weight |
| Methanol | 60 part by weight |
| N-butanol | 10 part by weight |
| Film thickness after drying | 40 μm, 80 μm |
| Pressure reduction degree of pressure reduction chamber | 0–500 Pa |

The composition of sub stream dope and other conditions that were employed in the examples of the multiple casting process are as the followings:

| | |
|---|---|
| Cellulose triacetate | 100 part by weight |
| Triphenylphosphate | 10 part by weight |
| Biphenyldiphenylphosphate | 5 part by weight |
| Methylene chloride | 400 part by weight |
| Methanol | 75 part by weight |
| N-butanol | 13 part by weight |
| Total film thickness after drying | 80 μm |
| Mainstream thickness | 76 μm |
| Sub stream thickness (the top and bottom layer) | 2 μm for each |

The casting apparatus shown in FIG. 3 was used.

In each condition of the example, mean length l of the casting ribbon, static pressure fluctuation range Δp of atmosphere surrounding the casting ribbon, thickness unevenness pitch a, thickness unevenness factor d, expansion frequency f, and expansion rate e of the casting ribbon were measured and the coating unevenness of the film was evaluated by visual observation.

Example 1

The film forming was executed under the conditions as the followings:

| | |
|---|---|
| 1) Distance h between the casting die and the support = | 3.5 mm |
| 2) Pressure reduction degree p of the pressure reduction chamber = | −200 Pa |
| 3) Dope viscosity μ = | 45 Pa * s |
| 4) Die lip clearance cl = | 0.9 mm |
| 5) Casting velocity v = | 83.3 cm/s |
| 6) Base thickness t = | 80 μm |
| This time, measured values were: | |
| | |
| Mean length l of the casting ribbon = | 10 mm, |
| Static pressure fluctuation range Δ p of atmosphere surrounding the casting ribbon = | 0.5 Pa, |
| Pitch a of the thickness unevenness = | 0.9 cm, |
| Thickness unevenness factor d = | 0.3%, |
| Expansion frequency f = | 93 (1/s), and |
| Expansion rate e of the casting ribbon = | 0.3%. |

In this example, the conditions and the measured values were in the domain of the lower part under the curve b in FIG. 1, and in the domain of the lower part under curve d in FIG. 2, and accordingly, the coating unevenness did not appeared.

Example 2

The film forming was executed under the conditions as the followings:

| | |
|---|---|
| 1) Distance h between the casting die and the support = | 3.5 mm |
| 2) Pressure reduction degree p of the pressure reduction chamber = | −100 Pa |
| 3) Dope viscosity μ = | 45 Pa * s |
| 4) Die lip clearance cl = | 0.9 mm |
| 5) Casting velocity v = | 83.3 cm/s |
| 6) Base thickness t = | 80 μm |
| This time, measured value were: | |
| | |
| Mean length l of the casting ribbon = | 14 mm, |
| Static pressure fluctuation range Δ p of atmosphere surrounding the casting ribbon = | 0.4 Pa, |

-continued

| | |
|---|---|
| Pitch a of the thickness unevenness = | 1.6 cm, |
| Thickness unevenness factor d = | 0.4%, |
| Expansion frequency f = | 52 (1/s), and |
| Expansion rate e of the casting ribbon = | 0.4%. |

In this example, the conditions and the measured values were in the domain of the lower part under the curve b in FIG. 1, and in the domain of the lower part under curve d in FIG. 2, and accordingly, the coating unevenness did not appeared.

Example 3

The film forming was executed under the conditions as the followings:

| | |
|---|---|
| 1) Distance h between the casting die and the support = | 3.5 mm |
| 2) Pressure reduction degree p of the pressure reduction chamber = | −40 Pa |
| 3) Dope viscosity μ = | 45 Pa * s |
| 4) Die lip clearance cl = | 0.9 mm |
| 5) Casting velocity v = | 83.3 cm/s |
| 6) Base thickness t = | 80 μm |
| This time, measured values were | |
| Mean length l of the casting ribbon = | 19 mm, |
| Static pressure fluctuation range Δ p of atmosphere surrounding the casting ribbon = | 0.4 Pa, |
| Pitch a of the thickness unevenness = | 2.4 cm, |
| Thickness unevenness factor d = | 0.9%, |
| Expansion frequency f = | 34.7 (1/s), and |
| Expansion rate e of the casting ribbon = | 0.9%. |

In this example, the conditions and the measured values were in the domain of the lower part under the curve b in FIG. 1, and in the domain of the lower part under curve d in FIG. 2, and accordingly, the coating unevenness did not appeared.

Example 4

The film forming was executed under the conditions as the followings:

| | |
|---|---|
| 1) Distance h between the casting die and the support = | 1.5 mm |
| 2) Pressure reduction degree p of the pressure reduction chamber = | zero Pa |
| 3) Dope viscosity μ = | 45 Pa * s |
| 4) Die lip clearance cl = | 1.2 mm |
| 5) Casting velocity v = | 58.3 cm/s |
| 6) Base thickness t = | 80 μm |
| This time, measured values were: | |
| Mean length l of the casting ribbon = | 12 mm, |
| Static pressure fluctuation range Δ p of atmosphere surrounding the casting ribbon = | 0.2 Pa, |
| Pitch a of the thickness unevenness = | 1.8 cm, |
| Thickness unevenness factor d = | 0.7%, |
| Expansion frequency f = | 32.4 (1/s), and |
| Expansion rate e of the casting ribbon = | 0.7%. |

In this example, the conditions and the measured values were in the domain between the curve a and the curb b in FIG. 1, and in the domain between the curve c and the curb d in FIG. 2, and accordingly, the coating unevenness appeared only weakly.

Example 5

The film forming was executed under the conditions as the followings:

| | |
|---|---|
| 1) Distance h between the casting die and the support = | 5 mm |
| 2) Pressure reduction degree p of the pressure reduction chamber = | 10 Pa |
| 3) Dope viscosity μ = | 45 Pa * s |
| 4) Die lip clearance cl = | 1.5 mm |
| 5) Casting velocity v = | 83.3 cm/s |
| 6) Base thickness t = | 80 μm |
| This time, measured values were: | |
| Mean length l of the casting ribbon = | 26 mm, |
| Static pressure fluctuation range Δ p of atmosphere surrounding the casting ribbon = | 2.0 Pa, |
| Pitch a of the thickness unevenness = | 4.0 cm, |
| Thickness unevenness factor d = | 9.0%, |
| Expansion frequency f = | 20.8 (1/s), and |
| Expansion rate e of the casting ribbon = | 9.0%. |

In this example, the conditions and the measured values were in the domain between the curve a and the curb b in FIG. 1, and in the domain between the curve c and the curb d in FIG. 2, and accordingly, the coating unevenness appeared only weakly.

Example 6

The film forming was executed under the conditions as the followings:

| | |
|---|---|
| 1) Distance h between the casting die and the support = | 3.5 mm |
| 2) Pressure reduction degree p of the pressure reduction chamber = | 300 Pa |
| 3) Dope viscosity μ = | 45 Pa * s |
| 4) Die lip clearance cl = | 1.0 mm |
| 5) Casting velocity v = | 83.3 cm/s |
| 6) Base thickness t = | 80 μm |
| This time, measured values were: | |
| Mean length l of the casting ribbon = | 7.0 mm, |
| Static pressure fluctuation range Δ p of atmosphere surrounding the casting ribbon = | 2.0 Pa, |
| Pitch a of the thickness unevenness = | 0.7 cm, |
| Thickness unevenness factor d = | 0.5%, |
| Expansion frequency f = | 119 (1/s), and |
| Expansion rate e of the casting ribbon = | 0.5%. |

In this example, the conditions and the measured values were in the domain between the curve a and the curb b in FIG. 1, and in the domain between the curve c and the curb d in FIG. 2, and accordingly, the coating unevenness appeared only weakly.

Example 7

The film forming was executed under the conditions as the followings:

| | |
|---|---|
| 1) Distance h between the casting die and the support = | 1.5 mm |
| 2) Pressure reduction degree p of the pressure reduction chamber = | zero Pa |

-continued

| | |
|---|---|
| 3) Dope viscosity μ = | 45 Pa * s |
| 4) Die lip clearance cl = | 1.2 mm |
| 5) Casting velocity v = | 33.3 cm/s |
| 6) Base thickness t = | 80 μm |
| This time, measured values were: | |
| Mean length of the casting ribbon l = | 12.0 mm, |
| Fluctuation frequency of static pressure near the casting ribbon = | 170 Hz, |
| Static pressure fluctuation range Δ p of atmosphere surrounding the casting ribbon = | 5.0 Pa, |
| Pitch a of the thickness unevenness = | 0.2 cm, |
| Thickness unevenness factor d = | 0.4%, |
| Expansion frequency f = | 166.5 (1/s), |
| and Expansion rate e of the casting ribbon = | 0.4%. |

In this example, the conditions and the measured values were in the domain between the curve a and the curb b in FIG. 1, and in the domain between the curve c and the curb d in FIG. 2, and accordingly, the coating unevenness appeared only weakly.

Example 8

The film forming was executed under the conditions as the followings:

| | |
|---|---|
| 1) Distance h between the casting die and the support = | 3.5 mm |
| 2) Pressure reduction degree p of the pressure reduction chamber = | −300 Pa |
| 3) Mainstream dope viscosity μ = | 45 Pa * s |
| Sub stream dope viscosity μs = | 20 Pa * s |
| 4) Die lip clearance cl = | 1.0 mm |
| 5) Casting velocity v = | 133.3 cm/s |
| 6) Base thickness t = | 80 μm |
| This time, measured values were: | |
| Mean length of the casting ribbon l = | 8 mm, |
| Static pressure fluctuation range Δ p of atmosphere surrounding the casting ribbon = | 0.2 Pa, |
| Pitch a of the thickness unevenness = | 1.2 cm, |
| Thickness unevenness factor d = | 0.1%, |
| Expansion frequency f = | 111 (1/s), and |
| Expansion rate e of the casting ribbon = | 0.1%. |

In this example, the conditions and the measured values were in the domain of the lower part under the curve b in FIG. 1, and in the domain of the lower part under curve d in FIG. 2, and accordingly, the coating unevenness did not appeared.

Example 9

The film forming was executed under the conditions as the followings:

| | |
|---|---|
| 1) Distance h between the casting die and the support = | 3.5 mm |
| 2) Pressure reduction degree p of the pressure reduction chamber = | −200 Pa |
| 3) Dope viscosity μ = | 45 Pa * s |
| 4) Die lip clearance cl = | 0.9 mm |
| 5) Casting velocity v = | 83.3 cm/s |
| 6) Base thickness t = | 80 μm |
| This time, measured values were: | |
| Mean length of the casting ribbon l = | 10 mm, |
| Static pressure fluctuation range Δ p of atmosphere surrounding the casting ribbon = | 1.2 Pa, |
| Pitch a of the thickness unevenness = | 0.9 cm, |
| Thickness unevenness factor d = | 0.7%, |
| Expansion frequency f = | 92.6 (1/s), and |
| Expansion rate e of the casting ribbon = | 0.7%. |

In this example, the conditions and the measured values were in the domain of the lower part under the curve b in FIG. 1, and in the domain of the lower part under curve d in FIG. 2, and accordingly, the coating unevenness did not appeared.

Comparative Example 1

The film forming was executed under the conditions as the followings:

| | |
|---|---|
| 1) Distance h between the casting die and the support = | 3.5 mm |
| 2) Pressure reduction degree p of the pressure reduction chamber = | −100 Pa |
| 3) Dope viscosity μ = | 45 Pa * s |
| 4) Die lip clearance cl = | 0.9 mm |
| 5) Casting velocity v = | 83.3 cm/s |
| 6) Base thickness t = | 80 μm |
| This time, measured values were: | |
| Mean length of the casting ribbon l = | 14 mm, |
| Static pressure fluctuation range Δ p of atmosphere surrounding the casting ribbon = | 2.4 Pa, |
| Pitch a of the thickness unevenness = | 1.6 cm, |
| Thickness unevenness factor d = | 2.4%, |
| Expansion frequency f = | 52 (1/s), and |
| Expansion rate e of the casting ribbon = | 2.4% |

In this example, the conditions and the measured values were in the domain of the upper part over the curve b in FIG. 1, and in the domain of the upper part over the curve d in FIG. 2, and accordingly, the coating unevenness appeared strongly.

Comparative Example 2

The film forming was executed under the conditions as the followings:

| | |
|---|---|
| 1) Distance h between the casting die and the support = | 3.5 mm |
| 2) Pressure reduction degree p of the pressure reduction chamber = | −40 Pa |
| 3) Dope viscosity μ = | 45 Pa * s |
| 4) Die lip clearance cl = | 0.9 mm |
| 5) Casting velocity v = | 83.3 cm/s |
| 6) Base thickness t = | 80 μm |
| This time, measured values were: | |
| Mean length l of the casting ribbon = | 19 mm, |
| Static pressure fluctuation range Δ p of atmosphere surrounding the casting ribbon = | 2.4 Pa, |
| Pitch a of the thickness unevenness = | 2.4 cm, |

-continued

| | |
|---|---|
| Thickness unevenness factor d = | 5.3%, |
| Expansion frequency f = | 34.7 (1/s), and |
| Expansion rate e of the casting ribbon = | 5.3%. |

In this example, the conditions and the measured values were in the domain of the upper part over the curve b in FIG. 1, and in the domain of the upper part over the curve d in FIG. 2, and accordingly, the coating unevenness appeared strongly.

Example 10

Changing dope prescription, the film forming was executed under the conditions as the followings:

| | |
|---|---|
| Cellulose triacetate | 100 part by weight |
| Triphenylphosphate | 10 part by weight |
| Biphenyldiphenylphosphate | 5 part by weight |
| Methyl acetate | 315 part by weight |
| Ethanol | 60 part by weight |
| N-butanol | 10 part by weight |

After swelling cellulose triacetate with solvent for 30 minutes, and after cooling at −70° C., dissolved them while warming in 50° C.

| | |
|---|---|
| 1) Distance h between the casting die and the support = | 3.5 mm |
| 2) Pressure reduction degree p of the pressure reduction chamber = | zero Pa |
| 3) Dope viscosity μ = | 30 Pa * s |
| 4) Die lip clearance cl = | 1.2 mm |
| 5) Casting velocity v = | 16.7 cm/s |
| 6) Base thickness t = | 80 μm |
| This time, measured values were: | |
| Mean length 1 of the casting ribbon = | 10 mm, |
| Static pressure fluctuation range Δ p of atmosphere surrounding the casting ribbon = | 0.5 Pa, |
| Pitch a of the thickness unevenness = | 1.0 cm, |
| Thickness unevenness factor d = | 0.1%, |
| Expansion frequency f = | 16.7 (1/s), and |
| Expansion rate e of the casting ribbon = | 0.1%. |

In this example, the conditions and the measured values were in the domain of the lower part under the curve b in FIG. 1, and in the domain of the lower part under curve d in FIG. 2, and accordingly, the coating unevenness did not appeared.

Because this invention proposes to settle the conditions in which the relation between the thickness unevenness and the pitch of it into the appropriate domain, regarding the thickness unevenness occurring in a longitudinal direction of the film produced with a solution film forming method, good appearance quality can be obtained even when the film is applied for coating.

While there has been described what is at present considered to be the preferred embodiment of the invention, it will be understood that various modifications may be made therein, and it is intended to cover in the appended claims all such modifications as fall within the true spirit and scope of the invention.

The invention claimed is:

1. A manufacturing method of a polymer resin film in which a solution of a high polymer resin dissolved in an organic solvent is cast from a die onto a support wherein casting velocity v [cm/s], expansion frequency f [1/s] and expansion rate e [%] of casting ribbon satisfy the following formula (3):

$$e \leq 0.46(v/f)^3 - 0.91(v/f)^2 + 0.60(v/f) + 1.01 \quad (3)$$

wherein $0.2 < (v/f) < 3$, wherein the high polymer resin is a cellulose ester.

2. A manufacturing method of a polymer resin film as claimed in claim 1, wherein the static pressure fluctuation range of atmosphere surrounding casting ribbon is 2.4 Pa or less.

3. A manufacturing method of a polymer resin film as claimed in claim 1, wherein the static pressure fluctuation range of atmosphere surrounding casting ribbon is 2.0 Pa or less.

4. A manufacturing method of a polymer resin film as claimed in claim 1, wherein the static pressure fluctuation range of atmosphere surrounding casting ribbon is 0.5 Pa or less.

5. A manufacturing method of a polymer resin film according to claim 1 wherein an external pressure disturbance is reduced by installing a wind shielding means in perimeter of the casting ribbon.

6. A manufacturing method of a polymer resin film according to claim 1 wherein multiple casting method is utilized.

7. A manufacturing method of a polymer resin film in which a solution of a high polymer resin dissolved in organic solvent is cast from a die onto a support wherein casting velocity v (cm/s), expansion frequency f [1/s] and expansion rate e of casting ribbon [%] satisfy the following formula (4):

$$e \leq 0.19(v/f)^3 - 0.38(v/f)^2 + 0.25(v/f) + 0.42 \quad (4)$$

wherein $0.2 < (v/f) < 3$, wherein the high polymer resin is a cellulose ester.

8. A manufacturing method of a polymer resin film as claimed in claim 7, wherein the static pressure fluctuation range of atmosphere surrounding casting ribbon is 2.4 Pa or less.

9. A manufacturing method of a polymer resin film as claimed in claim 7, wherein the static pressure fluctuation range of atmosphere surrounding casting ribbon is 2.0 Pa or less.

10. A manufacturing method of a polymer resin film as claimed in claim 7, wherein the static pressure fluctuation range of atmosphere surrounding casting ribbon is 0.5 Pa or less.

11. A manufacturing method of a polymer resin film according to claim 7 wherein an external pressure disturbance is reduced by installing a wind shielding means in perimeter of the casting ribbon.

12. A manufacturing method of a polymer resin film according to claim 7 wherein multiple casting method is utilized.

* * * * *